United States Patent
Lang et al.

(10) Patent No.: US 11,857,118 B2
(45) Date of Patent: Jan. 2, 2024

(54) DEVICE FOR POSITIONING A KITCHEN APPLIANCE, BASE UNIT INCLUDING THE DEVICE, AND METHOD OF USING THE BASE UNIT

(71) Applicant: Vorwerk & Co. Interholding GmbH, Wuppertal (DE)

(72) Inventors: Torsten Lang, Solingen (DE); Felix Haunschild, Essen (DE); Lennart Rusch, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 17/850,271

(22) Filed: Jun. 27, 2022

(65) Prior Publication Data

US 2022/0408979 A1    Dec. 29, 2022

(30) Foreign Application Priority Data

Jun. 28, 2021  (EP) .................................. 21181971

(51) Int. Cl.
*A47J 47/16*      (2006.01)
*F16M 11/04*      (2006.01)
(Continued)

(52) U.S. Cl.
CPC ............ *A47J 47/16* (2013.01); *F16M 11/045* (2013.01); *F16M 11/046* (2013.01); *F16M 11/08* (2013.01); *F16M 11/18* (2013.01)

(58) Field of Classification Search
CPC ..... A47J 47/16; F16M 11/045; F16M 11/046; F16M 11/08; F16M 11/18; A45C 5/146;
(Continued)

(56) References Cited

U.S. PATENT DOCUMENTS 1,225,644 A * 5/1917 Kandbinder .............. B60S 9/06
                                                      254/425
5,778,488 A * 7/1998 Tsai ....................... A45C 5/146
                                                      280/37

(Continued)

FOREIGN PATENT DOCUMENTS

DE     202019102012 U1    4/2019

OTHER PUBLICATIONS

Search Report for European Application No. 21181971.9 dated Dec. 8, 2021, with its English summary, 8 pages.

*Primary Examiner* — Christopher Garft
(74) *Attorney, Agent, or Firm* — Peter W. Schroen; Bret E. Field; Bozicevic, Field & Francis LLP

(57) ABSTRACT

The invention relates to a device (10) for displaceably positioning a kitchen appliance (11) on a working surface (12), comprising a displacement means (13) for displacing the kitchen appliance (11) on the working surface (12), wherein the displacement means (13) is designed for installation in a ground area (14) of a base unit (16) of the kitchen appliance (11), and a displacement means (15) for displacing the displacement means (13) between a deactivated state (Z1) of the displacement means (13) for positioning the displacement means (13) spaced from the working surface (12) and an activated state (Z2) of the displacement means (13) for positioning at least a part of the displacement means (13) on the working surface (12) for displacing the kitchen appliance (11). The invention further relates to a base unit (16) with a device (10) according to the invention, as well as a method for operating a base unit (16) according to the invention.

13 Claims, 4 Drawing Sheets

Figure 1:
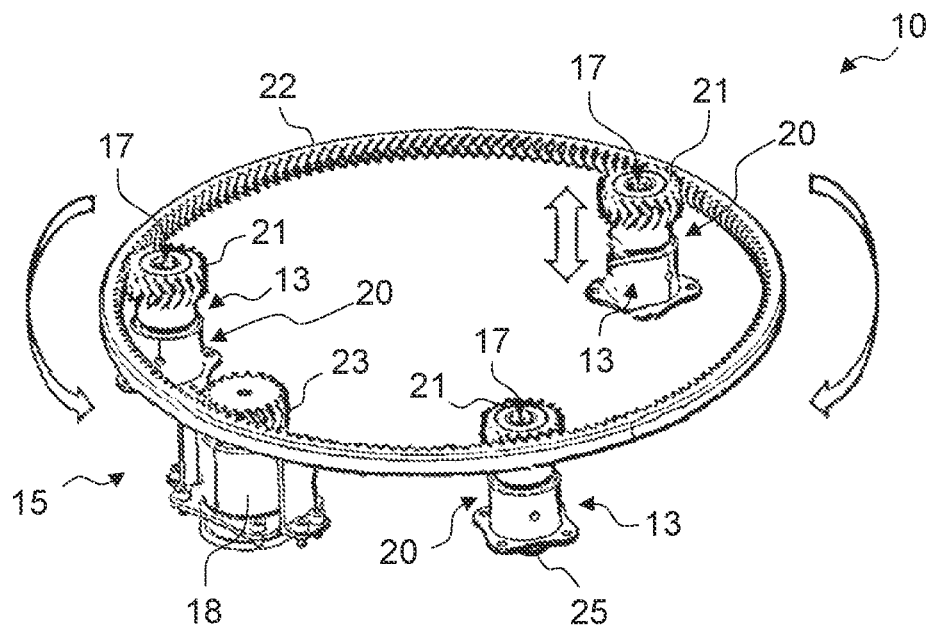

(51) Int. Cl.
*F16M 11/08* (2006.01)
*F16M 11/18* (2006.01)

(58) Field of Classification Search
CPC ...... A47B 91/02; A61G 1/0268; B60B 33/06; B60B 33/063; F60B 33/066
USPC .................................. 248/652; 16/19, 32–34
See application file for complete search history.

(56) References Cited

U.S. PATENT DOCUMENTS

| | | | |
|---|---|---|---|
| 5,940,953 A * | 8/1999 | Arends | B23Q 3/155 |
| | | | 280/47.35 |
| 8,240,681 B2 * | 8/2012 | Taguchi | B62B 5/0083 |
| | | | 16/34 |
| 2005/0058018 A1 | 3/2005 | Hooper et al. | |
| 2005/0194509 A1 * | 9/2005 | Tsai | A47B 49/00 |
| | | | 248/349.1 |
| 2016/0339742 A1 * | 11/2016 | Libakken | B60B 33/0015 |
| 2018/0370281 A1 * | 12/2018 | Hall | B60B 33/063 |
| 2019/0313855 A1 * | 10/2019 | Ambrose | B01F 35/42 |
| 2019/0357680 A1 * | 11/2019 | Timenes | F16M 3/00 |
| 2023/0001778 A1 * | 1/2023 | Timenes | B60K 17/043 |

* cited by examiner

DEVICE FOR POSITIONING A KITCHEN APPLIANCE, BASE UNIT INCLUDING THE DEVICE, AND METHOD OF USING THE BASE UNIT

The present invention relates to a device for positioning a kitchen appliance on a working surface to place the kitchen appliance in a desired position on the working surface. The invention further relates to a base unit for a kitchen appliance comprising such a device, and to a method of using such a base unit.

Kitchen appliances known in the prior art are usually relatively heavy due to their weight. If such a kitchen appliance is located on a working surface, it may well be a challenge for some people to move the kitchen appliance safely from one position to a desired other position. In particular, small and/or precise movement operations can be accomplished only with difficulty or with makeshift aids. For example, some people place the kitchen appliance on cloths and/or blankets to make it easier to move the kitchen appliance by pulling on the cloth or blanket. However, the cloths or blankets used are prone to dirt and are correspondingly unhygienic. Another solution for simplified repositioning of heavy kitchen appliances is to position the kitchen appliance on a commercially available rolling board that can be easily moved on the working surface. However, rolling boards prevent the kitchen appliance from standing securely. This can only be ensured with an additional braking device. Furthermore, it is known that sliding devices are used to push the kitchen appliance on the working surface to the desired position without lifting the kitchen appliance. Here, too, the stability of the kitchen appliance is reduced. In addition, known sliders can leave residues, for example in the form of welts, on the working surface. The described aids can also negatively affect any weighing functions of the kitchen appliance. Furthermore, stability during an operation of the kitchen appliance is fundamentally important to prevent injuries to the user of the kitchen appliance and/or damage to the kitchen appliance. In the design of conventional kitchen appliances, great importance is therefore attached to ensuring that the kitchen appliance is as stable as possible and that it is prevented from moving and/or slipping during operation of the kitchen appliance.

It is an object of the present invention to at least partially take into account the problem described above. In particular, it is an object of the present invention to provide a device as well as a method for the simple displacement of a kitchen appliance of the type described above while nevertheless maintaining a high level of operational safety of the kitchen appliance.

The foregoing object is solved by the claims. In particular, the foregoing object is solved by the device, the base unit, and the method, e.g., as described herein. In this context, features described in connection with the device naturally also apply in connection with the base unit according to the invention, the method according to the invention and vice versa in each case, so that reference is and/or can always be made mutually with regard to the disclosure concerning the individual aspects of the invention.

In accordance with a first aspect of the present invention, there is provided a device for a kitchen appliance for slidable positioning the kitchen appliance on a working surface. The device comprises a displacement element for displacing the kitchen appliance on the working surface, the displacement element being configured and adapted for installation in a ground area of a base unit of the kitchen appliance. The device further comprises an adjustment element for adjusting the displacement element, in particular the size and/or the position of the displacement element, between
- a deactivated state of the displacement element for positioning the displacement element at a distance from the working surface, in particular in a position in and/or on the kitchen appliance, and
- an activated state of the displacement element for positioning at least a part of the displacement element on the working surface for shifting the kitchen appliance.

As soon as the adjustment element has adjusted the displacement element to the activated state, the kitchen appliance and/or the base unit of the kitchen appliance can be shifted on the working surface in a simple manner, i.e. effortlessly or almost without force. If, on the other hand, the displacement element is in the deactivated state, a fixed position of the base unit and/or of the kitchen appliance for the ongoing operation (of the kitchen appliance) can preferably be ensured without impairing any weighing function, since the displacement element is positioned at a distance (i.e. spaced apart and free of contact) from the working surface. In other words, using the device according to the invention, both easy movement of the kitchen appliance and a safe standing of the kitchen appliance, and this without affecting appliance functions during operation, can be made possible. Thus, on the one hand, the convenience of moving the kitchen appliance can be significantly improved and, on the other hand, a high level of safety in the operation of the kitchen appliance can be achieved.

Previously known displacement element for kitchen appliances are always in an activated state as soon as they are installed on and/or in the kitchen appliance. Deactivation of a kitchen towel placed under the kitchen appliance or of a rolling board installed on the kitchen appliance is not possible, or at least not in the manner according to the invention, by a simple adjustment element. The simple adjustment element between the activated state and the deactivated state can protect a possibly existing and sensitive weighing function or corresponding sensors in the kitchen appliance. Service and/or repair work on the kitchen appliance can thus at least be reduced or even prevented.

By the kitchen appliance can be understood in particular a cooking and/or mixing appliance. By the base unit can be understood an appliance with a motor unit by a control unit for controlling and/or operating the kitchen appliance and/or a heating unit. Moving can be understood in particular a sliding and/or rolling, i.e. a linear movement of the kitchen appliance with as little resistance as possible (without having to lift the machine).

The ground area can be understood as the part of the base unit that is the bottom side of the base unit, i.e. the side that faces the working surface when the kitchen appliance is in use (and usually serves as a standing surface). The displacement element is configured and designed such that, in a state installed in the base unit, it is or can be moved in the direction of the working surface (when activated) from the ground area beyond the bottom side of the base unit. That is, the adjustment element may be configured and designed for adjusting the size and/or position of the displacement element between a deactivated state of the displacement element for positioning the displacement element entirely within the ground area and an activated state of the displacement element for moving at least a portion of the displacement element beyond the bottom side of the ground area. The adjustment element may be configured and designed for purely mechanical and preferably electromechanical adjustment of the displacement element.

For the displaceable positioning of the kitchen appliance, the displacement element has a displacement contact surface for contacting the working surface in the activated state, which has a better or higher sliding ability than a standing device of the kitchen appliance. In this context, the standing device can be considered to be a conventional standing device such as, for example, a rubberized and/or preferably non-slip standing device for non-slip positioning of the kitchen appliance and/or the base unit in each case in the deactivated state, which is thus configured for the most stable possible standing of the kitchen appliance on the working surface.

The working surface can be understood as any surface on which kitchen appliances of the type are usually placed and/or can be placed, i.e. in particular the upper side of a kitchen plate and/or a kitchen table. By installation is meant in particular a form-locking and/or force-locking, preferably detachable, installation with tools and thus in particular no simple positioning on a kitchen appliance and/or on a base unit. Adjusting the size and/or the position of the displacement element between the activated state and the deactivated state is preferably to be understood in the sense that the displacement element can be adjusted by the adjustment element back and forth between at least two (or more) different positions and/or shape states, in particular with mechanical and/or electromechanical aids. Embodiments and/or advantages described herein with reference to the base unit may be understood in an analogous manner with reference to the kitchen appliance. The same applies in an analogous manner vice versa.

According to a further embodiment of the present invention, it is possible that the displacement element comprises at least one roller or ball for rolling displacement of the kitchen appliance. By means of the roller or ball, the kitchen appliance can be moved particularly smoothly. Thus, a particularly precise positioning of the kitchen appliance is possible in a correspondingly simple manner. The at least one roller can be cylindrical or spherical. The at least one roller can thus be understood to be at least one castor. By means of a spherical roller, the kitchen appliance can be moved particularly easily in all directions on the working surface. Cylindrical rollers distribute the weight of the kitchen appliance particularly evenly on the working surface, whereby undesirable residues and/or damage to the working surface can be prevented. According to a preferred embodiment, the displacement element has three or four rollers for rolling displacement of the kitchen appliance. Preference is given to 3 rollers, since this always ensures a play-free (wobble-free) positioning of the kitchen appliance on the worktop. In a state of the device installed in the ground area, the at least one roller is located in the ground area at a distance from the working surface in the deactivated state and on the working surface in the activated state. In other words, the adjustment element may be configured and designed for adjusting or retracting and/or extending the displacement element between a deactivated state of the displacement element for positioning the at least one roller spaced from the working surface in and/or on the kitchen appliance and an activated state of the displacement element for positioning the at least one roller on the working surface for displacing the kitchen appliance.

Furthermore, it is possible that the displacement element in a device according to the invention has at least one sliding element for sliding displacement of the kitchen appliance. The sliding element makes it possible to move the kitchen appliance particularly gently on the working surface. The sliding element has a smaller coefficient of friction with respect to the working surface and/or a lower sliding resistance (due to the existing material and the designed contact surface) than a standing device and/or standing feet of the kitchen appliance. In a condition of the device installed in the ground area, the at least one sliding element is located in the ground area at a distance from the working surface in the deactivated condition and on the working surface in the activated condition. In other words, the displacement element may be configured and designed for displacing or retracting and/or extending the displacement element (as in the case of the rollers as displacement element) between a deactivated state of the displacement element for positioning the at least one sliding element spaced from the working surface in and/or on the kitchen appliance and an activated state of the displacement element for positioning the at least one sliding element on the working surface for displacing the kitchen appliance. The displacement element may comprise a combination of at least one roller and at least one sliding element. For example, the displacement element may comprise a roller and two sliding elements configured analogously to the embodiments described above.

Furthermore, a device according to the present invention may comprise a linear drive for a preferably translatory movement of at least one part of the displacement element between the deactivated state and the activated state. By the at least one part of the displacement element may be understood in particular the at least one roller and/or the at least one sliding element. By means of the linear drive, the displacement element and/or the at least one part of the displacement element can be adjusted between the deactivated and the activated state in a space-saving and robust manner. In a device according to the invention, in particular, the adjustment element is configured to control the linear drive and to adjust the displacement element accordingly. The linear drive or a corresponding linear drive system can be understood as all drive systems that lead to a (substantially) translatory movement of at least a part of the displacement element. By means of the linear drive, the at least one part of the displacement element can be moved and/or displaced in a straight line. For displacing the at least one part of the displacement element, the linear drive can have at least one ball screw drive, a threaded rod drive, a roller screw drive, a roller screw drive with roller return, a planetary roller screw drive, a hydraulic cylinder, a pneumatic cylinder, an electromechanical linear drive, a linear motor with electrodynamic operating principle and/or a linear actuator with piezoelectric, electrostatic, electromagnetic, magnetostrictive or thermoelectric operating principle. For the space-saving realization of the longest possible travel, the linear actuator can have a series connection of several actuators, i.e. a telescopically adjustable linear actuator.

Furthermore, it is possible that the adjustment element in a device according to the invention for adjusting the displacement element between the deactivated state and the activated state comprises a gear mechanism. By means of the gear mechanism, the displacement element can be easily displaced mechanically between the activated state and the deactivated state. Depending on the gear ratio of the gear mechanism, a small adjustment height or a small adjustment length of the displacement element between the activated state and the deactivated state can also be precisely realized.

A device has been found to be an advantageous embodiment in which the displacement element for displacing the kitchen appliance has a plurality of foot units which can be adjusted in size and/or position and are spaced apart from one another, the adjustment element having a gear wheel for each foot unit for adjusting the foot units, a gear rim which is in engagement with the gear wheels (which is preferably in engagement simultaneously with all the gear wheels of the adjustment element and may have helical teeth), and a drive pinion for driving the gear rim. Due to the preferably annular (with internal and/or external toothing) gear rim and the gear wheels, the adjustment element can easily and reliably adjust the displacement element (with all foot units in particular simultaneously) to the desired position. Instead of the mentioned toothed rim, also an (open (with 2 ends) or closed (without one end)) toothed belt can be used. To activate and/or drive the adjustment element, for example, only one electric motor can be provided to move and/or rotate the toothed rim. The electric motor may be considered a component of the adjustment element. The electric motor may further be understood as a drive motor for driving the adjustment element and/or for adjusting the displacement element. The gear wheels and the ring gear may each have intermeshing trapezoidal threads. The foot unit may each be understood as a threaded punch and/or punch-shaped foot unit. The gear wheel can be mechanically connected to the foot unit in a form-locking and/or force-locking manner and can be in engagement and/or operative connection with the gear rim for adjusting the displacement element, in which preferably the torque generated by the gear wheel can be transmitted to the foot unit, in particular the linear drive. It is also conceivable that a separate electric motor is used for each foot unit, whereby individual control of the individual foot unit is possible.

According to a further embodiment of the present invention, it is possible for the adjustment element to have a lever mechanism for adjusting the displacement element. With such a lever mechanism, it is possible to operate the adjustment element manually (by the user) and thus in a correspondingly simple manner. Electromotive drive units can be dispensed with. For example, it is possible to operate the adjustment element or to adjust the displacement element for displacing the kitchen appliance between the activated state and the deactivated state even without an existing power supply. Nevertheless, it is possible that the lever mechanism is configured as part of a motor and/or control unit of the kitchen appliance and, in particular, of the base unit, and is configured to be driven accordingly electrically or by an electric motor. For the smoothest possible operation of the lever mechanism and/or correspondingly smooth displacement of the kitchen appliance, it is possible that the lever mechanism has a pretensioning unit for pretensioning at least one lever of the lever unit. This can reduce the force required for the user of the kitchen appliance or the lever unit.

Another aspect of the present invention relates to a base unit for a kitchen appliance having a device according to the invention as described in detail above. The base unit has a housing with a container receptacle for receiving a food container and a ground area which is formed at least partially below the container receptacle, wherein the device is formed at least partially in the ground area. Thus, the base unit according to the invention provides the same advantages as have been described in detail with reference to the device according to the invention.

The base unit may comprise a motor unit for operating the kitchen appliance and/or for driving the device, and a control unit for controlling and/or monitoring the kitchen appliance and/or the device. The control unit may be understood as the control device described herein. Furthermore, the base unit may comprise a heating unit for heating food in the kitchen appliance and/or a food container positioned in and/or on the base unit. At least in the deactivated state of the displacement element, the device according to the invention is completely or substantially completely integrated and/or positioned in the ground area of the base unit. In the activated state of the displacement element, preferably only a part of the displacement element, in particular in the form of at least one roller and/or a sliding element, protrudes beyond a bottom or outer surface of the ground area. The base unit equipped with a device according to the invention is therefore indistinguishable from a base unit without the device according to the invention, at least in the deactivated state of the displacement element. Due to the at least approximately complete integration of the device into the ground area, the device is effectively protected against environmental influences. Accordingly, integration of the device into the ground area may be understood to mean that the device is installed within the ground area and/or in a ground-side area within the housing. The displacement element is displaceable, for spacing the housing from the working surface, to the activated state. That is, the base unit is configured to space the housing, including any feet, from the working surface when the displacement element is adjusted from the disabled state to the enabled state. More specifically, the housing is lifted upwards away from the working surface by contacting the displacement element at the working surface. In addition, at least one (preferably several) environment sensor may be provided, which is in particular data-connected to the control device, whereby the environment of the base unit can be monitored for possible collisions.

To achieve the highest possible operational safety of the base unit, a base unit according to the present invention may comprise a control device for (automatically) detecting an operational state of the base unit and for allowing an adjustment of the displacement element from the deactivated state to the activated state based on the detected operational state. That is, displacement of the device using an activated displacement element is possible only in a safe operating state of the base unit. For example, moving the displacement element to the activated state can be prevented and/or prohibited if food is being prepared by the base unit, a predefined temperature is detected in and/or on the base unit (by the control device) by a temperature sensor of the base unit, or the base unit is in operation for other predefined activities. Allowing the displacement element to be adjusted to the activated state can be done, for example, when the base unit is not in operation and/or is in a stand-by state, for example. Allowing the displacement can be understood in the sense that the control device allows and/or performs the displacement of the displacement element into the activated state when the base unit is in a predefined operating state and/or prevents and/or prohibits the displacement of the displacement element into the activated state when the displacement element is not in the predefined operating state and/or is in another predefined operating state.

According to a further embodiment of the present invention, a base unit has at least one (preferably exactly one "1") manually operable (by a user) actuating device for actuating the displacement element for displacing the displacement element between the deactivated state and the activated state, wherein the actuating device is formed on and/or in the housing. The manually operable actuating device can in particular have a lever mechanism for adjusting the displacement element from the deactivated state to the activated state and back. Ideally, all foot units of the displacement element are actuated (simultaneously) via the manually operable actuating device.

In a base unit according to the invention, the actuating device is preferably designed on a bottom side of the ground area. This protects the actuating device from environmental influences from the side and/or from above. Furthermore, accidental actuation or activation of the actuating device can be prevented in a simple manner. Nevertheless, it is possible that the base unit has an (electrical) operating unit for touch-sensitive (or non-contact) operation (for example, by a capacitive sensor and/or pressure sensor and/or switching element and/or optoelectronic sensor) of the base unit, wherein the operating unit comprises the actuating device. More specifically, the operating unit may visualize a control panel for (automatic and/or electric) actuation of the adjustment element (by the electric motor). When the base unit is located on the working surface for operation of the base unit, the bottom side faces the working surface or is facing the working surface. At least one recessed grip can be formed on the base unit and in particular on the housing of the base unit, in which the actuating device is positioned. The at least one recessed grip is preferably formed on the bottom side of the base unit and/or the housing. This enables simple operation or activation of the actuating device even without visual contact with the actuating device.

In a base unit according to the invention, the actuating device is preferably configured as a touch-sensitive actuating device for touch-sensitive control of the adjustment element. This means that the actuating device can be operated or activated particularly easily even without visual contact. Searching for and/or feeling protruding switches is not necessary. Thus, a particularly intuitive operation is possible. In addition, the actuating device is thus particularly resistant to dirt. This in turn leads to a correspondingly user-friendly mode of operation.

It may be of further advantage if a base unit of the present invention has a visualization device for generating an indication on the base unit and/or on the working surface that is visually perceptible to a user of the base unit for detecting a difference between the deactivated state and the activated state. This can also provide increased operational safety when the base unit is displaced or when the invention is used. After both the displacement element and the actuation device for activating the displacement element are designed to be as invisible as possible to the user on a bottom side of the base unit, a clearly recognizable indication (e.g. by the emitted color—a) red≙deactivated state and green≙activated state or b) continuous or flashing (green) dot≙activated state and no dot≙deactivated state) of the activated state can be given by the visualization device. At this point, it is clear to the user that the base unit should now be carefully moved to the desired position, or the displacement element should be adjusted back to the deactivated state to avoid unintentional damage to the base unit and/or itself. The visualization device may have an underbody light to indicate the activated state by means of light on the working surface in the ground area and/or in the area of the bottom side. For this purpose, the visualization device may have at least one illuminating device, in particular in the form of at least one LED. The illuminating device is preferably designed in the ground area, in particular at least partially on an outer side, in particular on the bottom side, in the ground area of the housing.

According to another aspect of the present invention, there is provided a method of using and/or operating a base unit as described above. The method comprises the following stages/steps:

detecting an adjustment request from a user of the base unit to adjust the displacement element from the deactivated state to the activated state, detecting an operating state of the base unit, and setting the displacement element to the activated state depending on the detected operating state of the base unit.

As described above, the operating state is preferably determined or ascertained by the control device. To determine the operating state, the control device can detect a temperature in and/or on the base unit via at least one temperature sensor of the base unit, the current weight of the base unit and/or a current load on the base unit via a weighing device, a rotational speed of a stirring unit of the base unit via at least one rotational speed sensor of the base unit and/or a current power consumption of the base unit via a power determination unit of the base unit and determine or ascertain the operating state of the base unit based thereon. In other words, this can be understood as a safety check so that the base unit can only be moved in an operating state that is safe for the base unit and/or the user of the base unit.

Further measures improving the invention will be apparent from the following description of various embodiments of the invention, which are shown schematically in the figures. All features and/or advantages arising from the claims, the description or the figures, including constructional details and spatial arrangements, may be essential to the invention both individually and in the various combinations.

Figure 2:
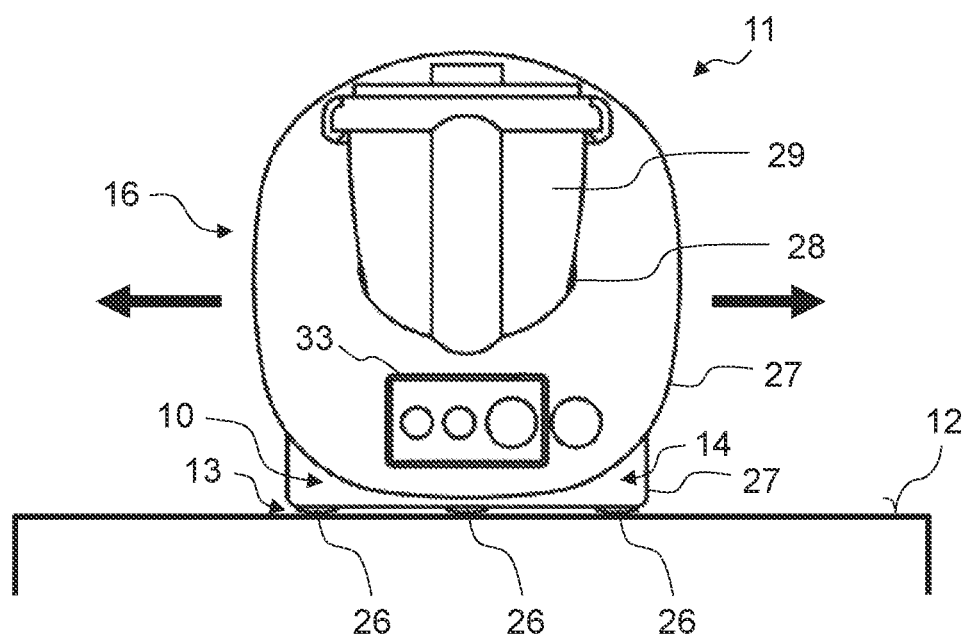
Figure 3:
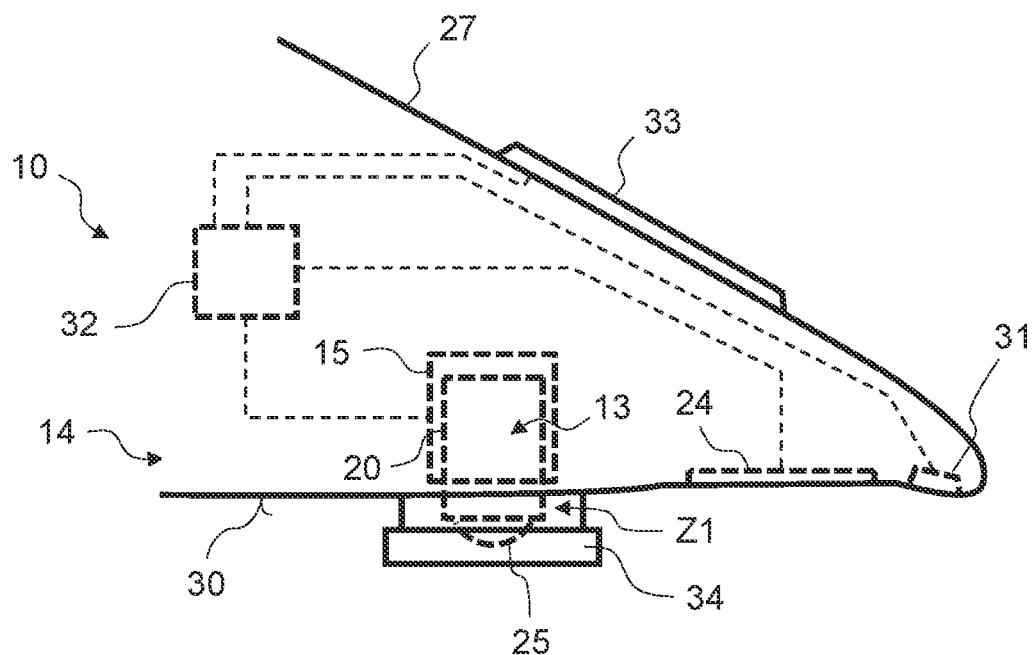
Figure 4:
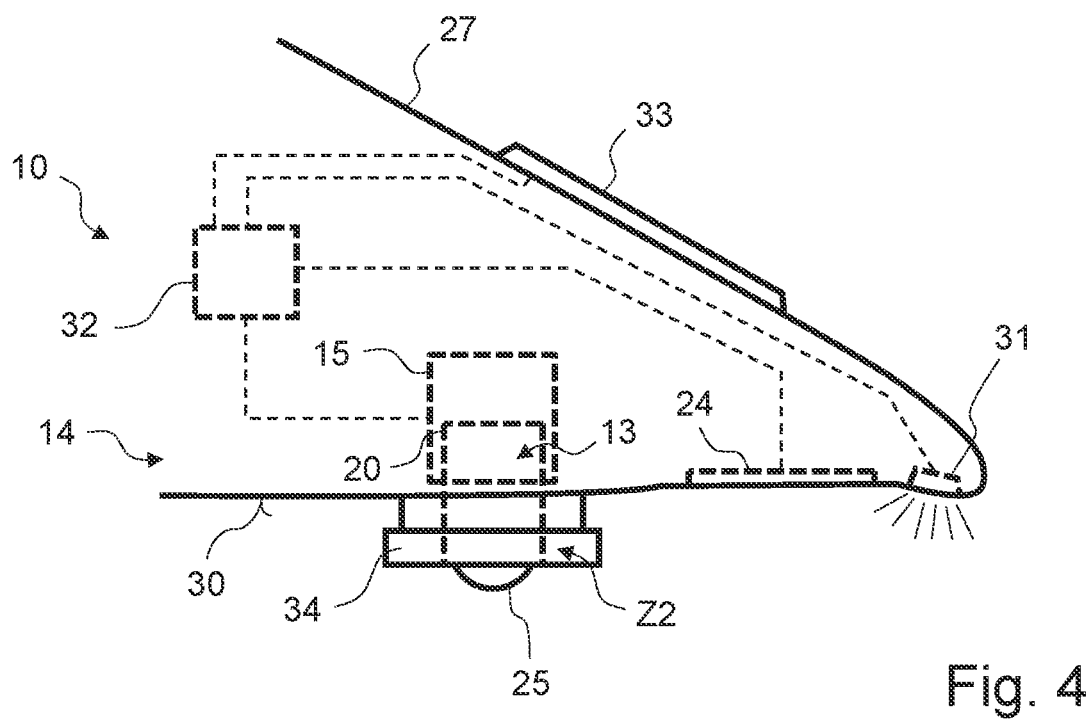
Figure 5:
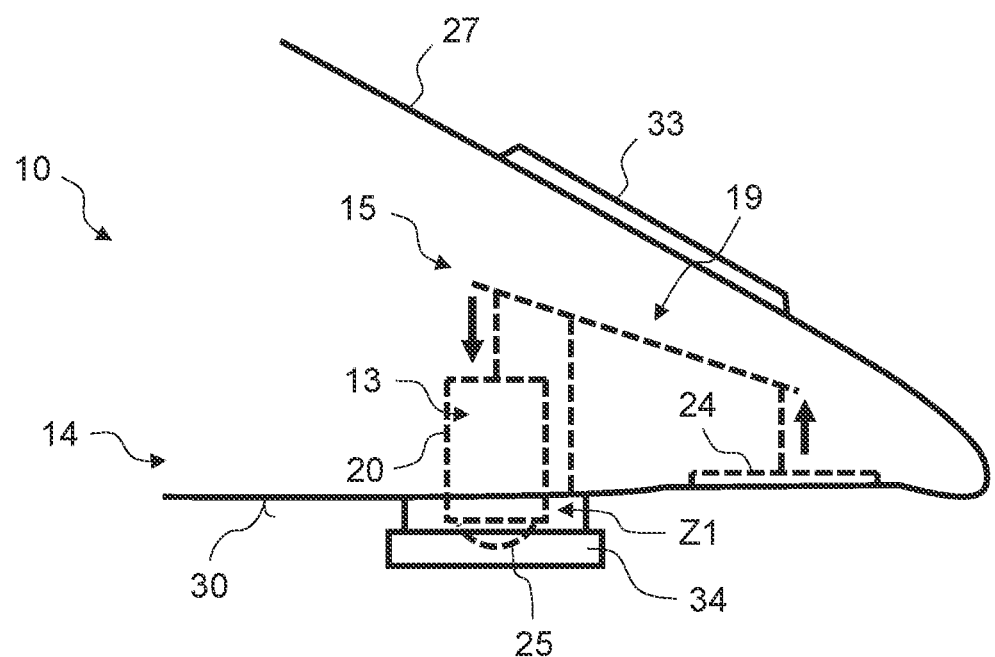
Figure 6:
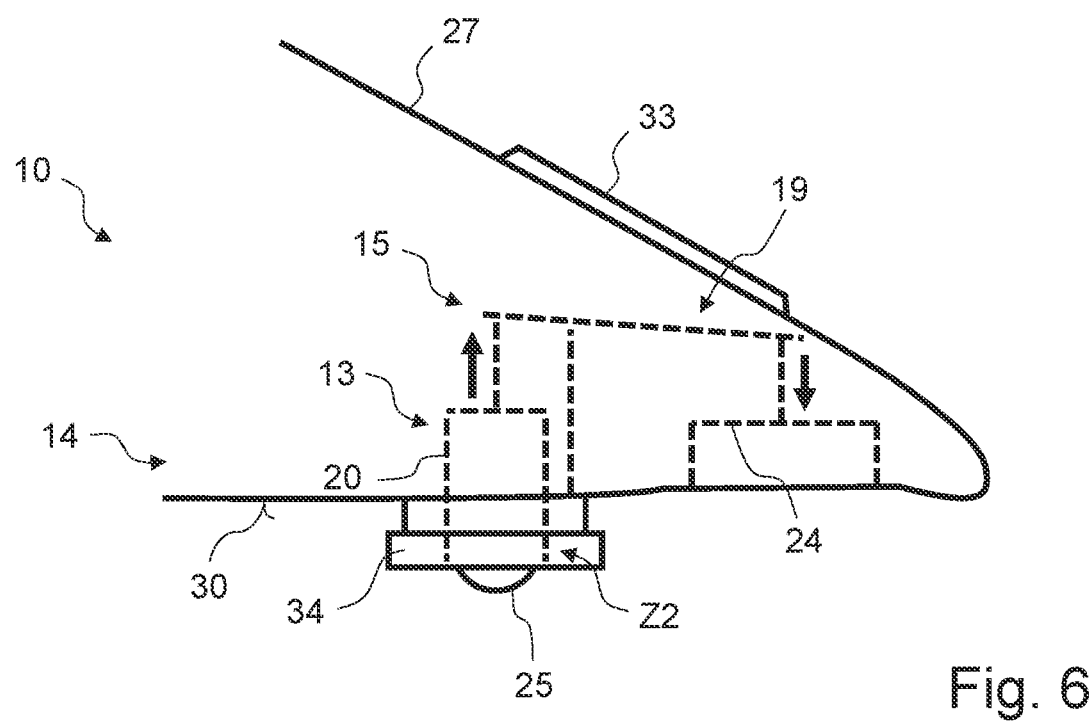
Figure 7:
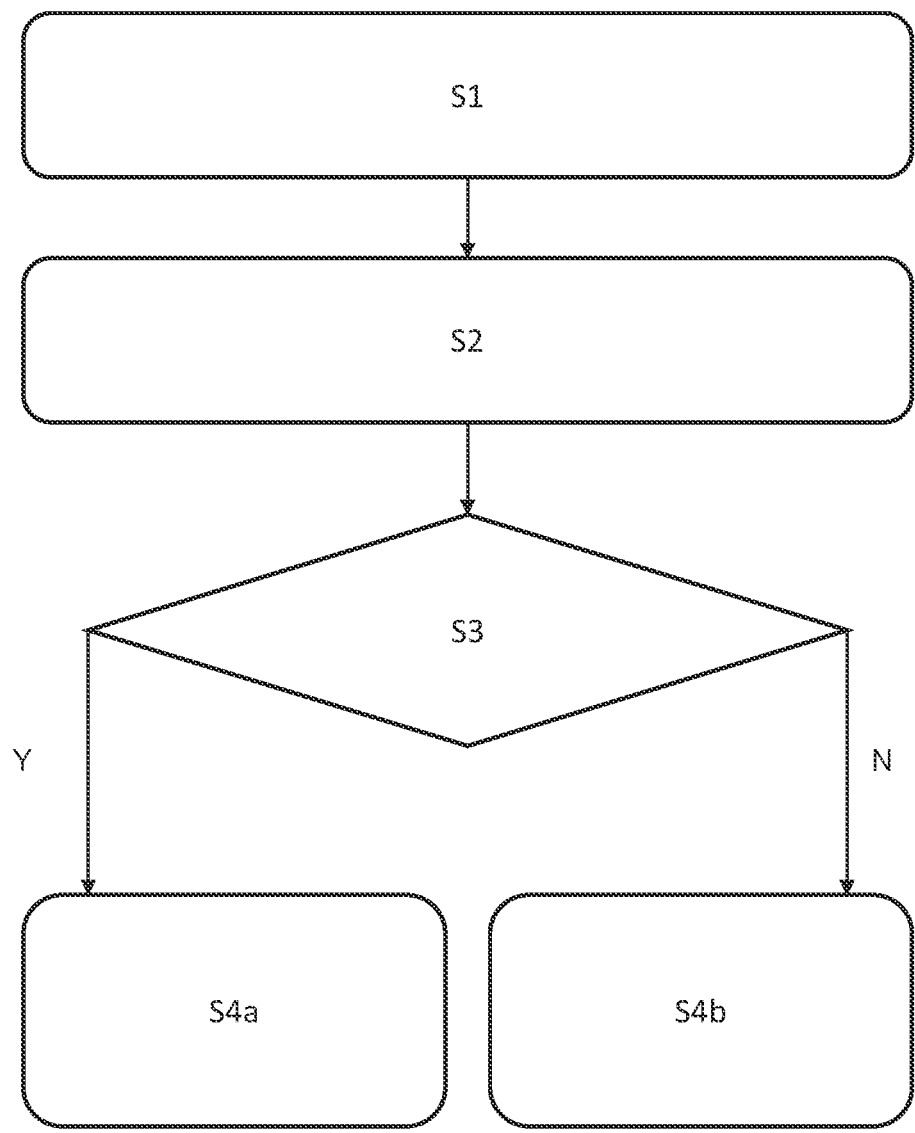

It show schematically in each case:

FIG. 1 a device according to the invention for installation in a kitchen appliance, FIG. 2 a kitchen appliance having a base unit and a device installed in the base unit according to the present invention, FIG. 3 a side view of a ground area of a base unit according to the invention in accordance with a first embodiment with a displacement element in a deactivated state of the displacement element, FIG. 4 a side view of the ground area of the base unit according to the first embodiment with the displacement element in an activated state of the displacement element, FIG. 5 a side view of a ground area of a base unit according to the invention in accordance with a second embodiment with a displacement element in a deactivated state of the displacement element, FIG. 6 a side view of the ground area of the base unit according to the invention in accordance with the second embodiment with the displacement element in an activated state of the displacement element, and FIG. 7 a flow chart explaining a process according to the invention.

Elements with the same function and mode of operation are each given the same reference signs in the figures.

FIG. 1 shows a device 10 for displaceably positioning a kitchen appliance 11 shown in FIG. 2 on a working surface 12. The device comprises a displacement element 13 for displacing the kitchen appliance 11 on the working surface 12, the displacement element 13 being configured and designed for installation in a ground area 14 of a base unit 16 of the kitchen appliance 11. The device further comprises adjustment element 15 for adjusting the size and, in particular, the position of the displacement element 13 between a deactivated state Z1 of the displacement element 13 for positioning the displacement element 13 spaced from the working surface 12 in and/or on the kitchen appliance 11 and an activated state Z2 of the displacement element 13 for positioning at least a part of the displacement element 13 on the working surface 12 for displacing the kitchen appliance 11. Deactivated states Z1 and activated states Z2 of various embodiments are shown in FIGS. 3 to 6 and will be described in detail later.

In the device 10 shown in FIG. 1, the displacement element 13 for displacing the kitchen appliance 11 has a plurality of stamp-shaped foot units 20 that are adjustable in size and position and spaced apart from one another. The adjustment element 15 comprises a gear wheel 21 for each foot unit 20 for displacing the foot units 20, a gear rim 22 engaged with the gear wheels 21, and a drive pinion 23 for driving the gear rim 22. For adjusting the displacement element 13 between a deactivated state Z1 and an activated state Z2, the adjustment element 15 thus has a gear mechanism 21, 22.

The adjustment element 15 further comprises an electric motor 18 for displacing the displacement element 13 by driving the drive pinion 23. In the device 10 shown in FIG. 1, a roll 25 in the form of a track roller for rolling displacement of the kitchen appliance 11 is arranged on each foot unit 20 as a component of the displacement element 13. A linear drive 17 for a translatory movement of at least a part of the displacement element 13 between the deactivated state Z1 and the activated state Z2 is installed in each of the foot units 20 shown by the gear wheels 21.

FIG. 2 illustrates a kitchen appliance 11 having a base unit 16 and a food container 29 positioned in the base unit 16. The food container 29 is positioned in a container receptacle 28 of the base unit 16. The container receptacle 28 is configured as part of a housing 27 of the base unit 16. The base unit 16 further comprises an operating unit 33 for operating the base unit 16 and the kitchen appliance 11. The operating unit 33 comprises a touch-sensitive input and display screen. A device 10 shown as in FIG. 1 (not shown in detail) is installed in a ground area 14 of the housing 27 or the base unit 16. The device 10 has a displacement element 13 which has sliding element 26 instead of the rollers 25 shown in FIG. 1. In the base unit 16 shown in FIG. 2, the displacement element 13 is in an activated state Z2, in which the sliding element 26 or a part of the displacement element 13 contacts the working surface 12 and the housing 27 is spaced from the working surface 12.

FIGS. 3 and 4 each show a side view of a ground area 14 of a base unit 16 according to a first embodiment. In the base unit 16 shown in FIG. 3, the displacement element 13 is located in a deactivated state Z2 within the housing 27, wherein a stand 34 or stands 34 can be regarded as part of the housing 27 in the present case. The base unit 16 shown comprises a control device 32 for detecting an operating state of the base unit 16 and for allowing the displacement element 13 to be moved, based on the detected operating state, from the deactivated state Z1 to the activated state shown in FIG. 4. The control device 32 may be understood as a central control unit of the kitchen appliance 11 and/or the base unit 16. The control device 32 is in signal connection with the operating unit 33, the adjustment element 15 and an actuating device 24 of the base unit 16. The actuating device 24 is designed in a recessed grip as a manually operable actuating device 24 for actuating the adjustment element 15 for adjusting the displacement element 13 between the deactivated state Z1 and the activated state Z2. The actuating device 24 shown in FIG. 3 is designed on a bottom side 30 of the ground area 14 of the housing 27. Furthermore, the actuating device 24 is configured as a touch-sensitive or touch-sensitive actuating device 24 for touch-sensitive actuation of the adjustment element 15. The base unit 16 shown in FIG. 3 further comprises visualization element 31 for generating an indication on the base unit 16 that can be visually perceived by a user of the base unit 16, and in particular on the working surface 12 below the base unit 16, for detecting a difference between the deactivated state Z1 and the activated state Z2. For the desired visualization, the visualization device has LED elements. Once the displacement element 13 is in the activated state Z2, the visualization element 31 is activated synchronized by the control device 32 for illuminating the working surface 12 under the bottom side 30. This is shown in FIG. 4. In the example shown, the visualization element 31 can thus be understood as underbody light of the base unit 16. The base unit 16 may be configured such that the displacement element 13 is in the activated state Z2 only as long as a user touches the actuation device 24. As soon as the actuating device 24 is no longer touched, the adjustment element 15 adjusts the displacement element 13 back to the deactivated state Z2, in which the roll 25 are displaced back into the housing 27. The light emitted by the visualization element 31 is synchronously switched off, in particular faded out. The base unit 16 now stands firmly on the working surface 12 again.

FIGS. 5 and 6 each show a side view of a ground area 14 of a base unit 16 according to a second embodiment. The base unit 16 according to the second embodiment is characterized in particular by a lever mechanism 19 of the adjustment element 15 for adjusting the displacement element 13, which is installed instead of the electromotive drive unit according to the first embodiment.

With reference to FIG. 7, a method for the safe use or operation of a base unit as described above is then explained. Within the scope of the method, in a first stage S1, an adjustment request of a user of the base unit 16 for adjusting the displacement element 13 from the deactivated state Z1 to the activated state Z2 is first detected. This can be detected by detecting or determining an exertion of pressure on the actuating device 24 and/or a touching of the actuating device 24. In a second stage S2, an operating state of the base unit 16 is detected and/or determined, at least approximately simultaneously. For detecting and/or determining the operating state, a temperature in and/or at the food container 29, a rotational speed of an agitator (not shown) of the base unit 16 and/or a weight of food in the food container 29 are determined. In a stage S3, it is now determined whether the operating state with reference to the user's adjustment request is classified as a critical or "dangerous" operating state, i.e. an operating state in which an increased danger to the user can be expected during the displacement of the kitchen appliance 11. If this is not the case (Y(es)—case), the displacement element can be adjusted to the activated state according to stage S4a. If, on the other hand, the base unit 16 is in a critical operating state or an operating state unsuitable for displacement according to stage S4b (impermissible case/N(o)—case), displacement of the displacement element 13 into the activated state Z2 is prevented or not even permitted. At the same time, a corresponding notice and/or warning is issued to the user via the operating unit 33. In other words, for safety reasons, the functionality of moving into the activated state is available to the user (exactly) only when the base unit is in a predefined safe operating state.

The invention admits of further design principles in addition to the embodiments illustrated. That is, the invention is not to be considered limited to the embodiments explained with reference to the figures. For example, the housing 27 may be designed without conventional feet 34, but with a standing surface without projections from the bottom side 30. Furthermore, the lever mechanism 19 may comprise a biasing unit for biasing at least one lever of the lever mechanism 19 in order to facilitate an adjustment of the displacement element 13 to the activated state Z1 by the user.

LIST OF REFERENCE SIGNS

10 Device
11 Kitchen appliance
12 Working surface
13 Displacement element
14 Ground area
15 Adjustment element
16 Base unit
17 Linear drive
18 Electric motor
19 Lever mechanism
20 Foot unit
21 Gear wheel
22 Gear rim
23 Drive pinion
24 Actuating device
25 Roll
26 Sliding element
27 Housing
28 Container receptacle
29 Food container
30 Bottom side
31 Visualization element
32 Control device
33 Operating unit
34 Stand
Z1 deactivated state
Z2 activated state
S1 Detect adjustment request of a user
S2 Detect operating state of the base unit
S3 Critical operating state?
S4a Y(es): displacement element in activated state
S4b N(o): displacement element in deactivated state (and prevent shifting and issue warning to user)

The invention claimed is:

1. A base unit for a kitchen appliance, the base unit comprising:
    a device for displaceable positioning of a kitchen appliance on a working surface, comprising a displacement element for displacing the kitchen appliance on the working surface, wherein the displacement element is configured for installation in a ground area of the base unit of the kitchen appliance,
    a control device for detecting an operating state of the base unit and allowing the displacement element to be displaced from the deactivated state to the activated state based on the detected operating state, wherein the control device is configured to detect the operating state of the base unit by detecting a temperature of the base unit, by detecting a current weight of the base unit, by detecting a weight of a current load on the base unit, by detecting a rotational speed of a stirring unit of the base unit, or by detecting a current power consumption of the base unit, and
    a housing having a container receptacle for receiving a food container and a ground area formed at least partially below the container receptacle, wherein the device is formed at least partially in the ground area, wherein,
the base unit comprises an adjustment element for adjusting the displacement element between
    a deactivated state of the displacement element for positioning the displacement element at a distance from the working surface, and
    an activated state of the displacement element for positioning at least a part of the displacement element on the working surface for displacing the kitchen appliance.

2. The base unit according to claim 1,
wherein
the displacement element comprises at least one roll for rolling displacement of the kitchen appliance.

3. The base unit according to claim 1,
wherein
the displacement element has at least one sliding element for sliding the kitchen appliance.

4. The base unit according to claim 1,
further comprising a linear drive for a translatory movement of at least a part of the displacement element between the deactivated state and the activated state.

5. The base unit according to claim 1,
wherein
the adjustment element for adjusting the displacement element between the deactivated state and the activated state has a gear mechanism.

6. The base unit according to claim 1,
wherein
the displacement element for displacing the kitchen appliance comprises a plurality of foot units adjustable at least in size or position and spaced apart from each other, and the adjustment element comprises a gear wheel for each foot unit for adjusting the foot units, a gear rim meshing with the gear wheels, and a drive pinion for driving the gear rim.

7. The base unit according to claim 1,
wherein
the adjustment element has an electric motor for adjusting the displacement element.

8. The base unit according to claim 1,
wherein
the adjustment element has a lever mechanism for adjusting the displacement element.

9. The base unit according to claim 1,
further comprising a manually operable actuating device for actuating a displacement means for displacing the displacement element between the deactivated state and the activated state, wherein the actuating device is at least formed on or in the housing.

10. The base unit according to claim 9,
wherein
the actuating device is configured on a bottom side of the ground area.

11. The base unit according to claim 9,
wherein
the actuating device is configured as a touch-sensitive actuating device for touch-sensitive actuation of the adjustment element.

12. The base unit according to claim 1,
further comprising a visualization element for generating at least an indication on the base unit or on the working surface that can be visually perceived by a user of the base unit for detecting a difference between the deactivated state and the activated state.

13. A method of using a base unit according to claim 1, comprising:

detecting an adjustment request by a user of the base unit for adjusting the displacement element from the deactivated state to the activated state, detecting an operating state of the base unit, and setting the displacement element to the activated state depending on the detected operating state of the base unit.

\* \* \* \* \*